United States Patent
He et al.

(10) Patent No.: US 12,520,209 B2
(45) Date of Patent: Jan. 6, 2026

(54) HANDOVER TO DUAL CONNECTIVITY

(71) Applicant: Nokia Technologies Oy, Espoo (FI)

(72) Inventors: Jing He, Beijing (CN); Ping Yuan, Beijing (CN); Malgorzata Tomala, Wroclaw (PL); Tero Henttonen, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 715 days.

(21) Appl. No.: 17/759,065

(22) PCT Filed: Feb. 12, 2020

(86) PCT No.: PCT/CN2020/074932
§ 371 (c)(1),
(2) Date: Jul. 19, 2022

(87) PCT Pub. No.: WO2021/159336
PCT Pub. Date: Aug. 19, 2021

(65) Prior Publication Data
US 2023/0032077 A1 Feb. 2, 2023

(51) Int. Cl.
*H04W 36/00* (2009.01)
*H04W 36/14* (2009.01)
*H04W 74/0833* (2024.01)

(52) U.S. Cl.
CPC ... *H04W 36/0079* (2018.08); *H04W 36/0069* (2018.08); *H04W 74/0833* (2013.01); *H04W 36/14* (2013.01)

(58) Field of Classification Search
None
See application file for complete search history.

(56) References Cited

U.S. PATENT DOCUMENTS 10,015,807 B2 7/2018 Heo et al.
12,149,998 B2 * 11/2024 Chang .................. H04W 76/30
(Continued)

FOREIGN PATENT DOCUMENTS

CN 105144830 A 12/2015
CN 108307539 A 7/2018
(Continued)

OTHER PUBLICATIONS

Office action received for corresponding Chinese Patent Application No. 202080096257.5, dated Dec. 18, 2024, 8 pages of office action and 3 pages of translation available.
(Continued)

*Primary Examiner* — Jutai Kao
(74) *Attorney, Agent, or Firm* — Carter, DeLuca & Farrell LLP

(57) ABSTRACT

Embodiments of the present disclosure relate to methods, apparatuses and computer readable storage media for a handover to dual connectivity. According to embodiments of the present disclosure, a terminal device receives, from a source network device, a connection reconfiguration message comprising configurations about a target master network device and a target secondary network device to be connected with the terminal device. The terminal device performs parallel random access to the target master network device and the target secondary network device. If the terminal device successfully connects to the target secondary network device but fails to connect to the target master network device, the terminal device will reconnect to the target master network device. In addition, the target secondary network device will indicate to the target master network device a result of the random access. As such, the solution can increase the success rate of the handover to dual connectivity.

1 Claim, 8 Drawing Sheets

(56) References Cited

U.S. PATENT DOCUMENTS

| | | | | |
|---|---|---|---|---|
| 12,289,646 | B2* | 4/2025 | Parichehrehteroujeni | ............... H04W 36/362 |
| 2015/0173047 | A1* | 6/2015 | Yamada | ............... H04W 72/23 370/329 |
| 2015/0215826 | A1 | 7/2015 | Yamada | |
| 2018/0092156 | A1* | 3/2018 | Kim | ............... H04W 12/03 |
| 2018/0324663 | A1 | 11/2018 | Park et al. | |
| 2019/0045568 | A1 | 2/2019 | Palat et al. | |
| 2019/0150037 | A1* | 5/2019 | Mildh | ............... H04W 36/0005 370/331 |
| 2019/0182732 | A1* | 6/2019 | Wei | ............... H04W 36/0066 |
| 2019/0281650 | A1 | 9/2019 | Wu | |
| 2021/0258777 | A1* | 8/2021 | Liu | ............... H04W 36/0038 |
| 2022/0132615 | A1* | 4/2022 | Sharma | ............... H04W 48/20 |

FOREIGN PATENT DOCUMENTS

| | | |
|---|---|---|
| CN | 108990101 A | 12/2018 |
| CN | 109819491 A | 5/2019 |
| CN | 110169125 A | 8/2019 |
| CN | 110402592 A | 11/2019 |
| CN | 110582128 A | 12/2019 |
| EP | 3453221 B1 | 1/2020 |
| KR | 20170114258 A | 10/2017 |
| WO | 2016/119210 A1 | 8/2016 |
| WO | 2017/026263 A1 | 2/2017 |
| WO | 2018/231136 A1 | 12/2018 |
| WO | 2019/157706 A1 | 8/2019 |

OTHER PUBLICATIONS

Office action received for corresponding Japanese Patent Application No. 2022-548994, dated Aug. 3, 2023, 3 pages of office action and 5 pages of translation available.

"Fast MCG link Recovery with SRB3 and split SRB1", 3GPP TSG-RAN3 Meeting #105bis, R3-195257, Agenda: 11.3, Huawei, Oct. 14-18, 2019, pp. 1-4.

Office action received for corresponding Vietnamese Patent Application No. 1-2022-05620, dated Sep. 28, 2022, 1 pages of office action and 1 page of translation available.

Office action received for corresponding Indian Patent Application No. 202247050875, dated Dec. 1, 2022, 6 pages.

Extended European Search Report received for corresponding European Patent Application No. 20919293.9, dated Oct. 11, 2023, 9 pages.

"Fast SN Activation in Handover to EN-DC", 3GPP TSG-RAN WG3 Meeting#105bis, R3-195496, Agenda: 11.2, Qualcomm Incorporated, Oct. 14-18, 2019, 4 pages.

"SN continuation on MN failure in EN-DC operation", 3GPP TSG-RAN WG2 NR Ad hoc#2, R2-1706942, Agenda: 10.2.4, Samsung, Jun. 27-29, 2017, 4 pages.

"Additional use cases for MCG fast recovery", 3GPP TSG-RAN WG2 Meeting #106, R2-1905826, Agenda: 11.10.5, Vivo, May 13-17, 2019, 5 pages.

Office Action received for corresponding Chinese Patent Application No. 202080096257.5, dated Jul. 29, 2024, 9 pages, no translation available.

"SN continuation on MN failure in EN-DC operation", 3GPP TSG-RAN WG2 #99, R2-1709053, Agenda: 10.2.5, Samsung, Aug. 21-25, 2017, 4 pages.

"Report on Email Discussion [107b#52][NR MobE] Open Issues Conditional PSCell Addition/Change (Catt)", 3GPP TSG-RAN WG2 Meeting #108, R2-1916300, Agenda: 6.9.4, CATT (Rapporteur), Nov. 18-22, 2019, 46 pages.

Office Action received for corresponding Indonesian Patent Application No. P00202209272, dated Aug. 16, 2024, (3 pages), English translation (3 pages), 6 pages total.

"Support of inter-RAT HO from SA to EN-DC in Rel-16", 3GPP TSG-RAN WG2 #108, R2-1914511, Agenda: 6.20.1, China Telecom, Nov. 18-22, 2019, 4 pages.

"Fast SN Activation in Handover to EN-DC", 3GPP TSG-RAN WG2 Meeting #108, R2-1915010, Agenda: 6.20.1, Qualcomm Incorporated, Nov. 18-22, 2019, 4 pages.

"3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.8.0, Dec. 2019, pp. 1-71.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0,Dec. 2019, pp. 1-964.

"IEEE 802.11", Wikipedia, Retrieved on Jul. 22, 2022, Webpage available at : https://en.wikipedia.org/wiki/IEEE_802.11.

International Search Report and Written Opinion received for corresponding Patent Cooperation Treaty Application No. PCT/CN2020/074932, dated Oct. 26, 2020, 9 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.6.0, Jun. 2019, pp. 1-365.

Notice of Allowance received for corresponding Chinese Patent Application No. 202080096257.5, dated Feb. 28, 2025, 4 pages of Notice of Allowance and no page of translation available.

* cited by examiner

HANDOVER TO DUAL CONNECTIVITY

RELATED APPLICATION

This application was originally filed as PCT Application No. PCT/CN2020/074932, filed on Feb. 12, 2020, which is incorporated herein by reference in its entirety.

TECHNICAL FIELD

Embodiments of the present disclosure generally relate to the field of telecommunications, and in particular, to methods, apparatuses and computer readable media for a handover to dual connectivity.

BACKGROUND

In Release 15 of 3GPP specifications, an inter-radio access technology (inter-RAT) handover to E-UTRA New Radio (NR) Dual Connectivity (EN-DC) is not supported. For example, a source NR network device (such as, a next generation NodeB, also referred to as "gNB") can only first hand over a terminal device (such as, user equipment) from the gNB to a target Long Term Evolution (LTE) network device (such as, an Evolved NodeB, also referred to as "eNodeB" or "eNB") and then configure EN-DC by adding a secondary network device after the handover. It is desirable to introduce a direct inter-RAT handover from NR to EN-DC, which can reduce signaling overhead and ensure a consistent high data rate for enhanced mobile broadband (eMBB) services.

SUMMARY

In general, example embodiments of the present disclosure provide methods, apparatuses and computer readable media for a handover to dual connectivity.

In a first aspect, there is provided a method. The method comprises receiving, at a first device, a connection reconfiguration message from a fourth device connected with first device, the connection reconfiguration message comprising a first configuration about a second device and a second configuration about a third device; performing first random access to the second device based on the first configuration and second random access to the third device based on the second configuration, to connect to the second device and the third device; and in response to failure of the first random access and success of the second random access, reconnecting to the second device based on the first configuration while keeping connected to the third device.

In a second aspect, there is provided a method. The method transmitting, from a second device to a fourth device connected with a first device, a connection reconfiguration message comprising configurations about the second device and a third device to be connected with the first device, to enable the first device to perform first random access to the second device and second random access to the third device; determining whether the first random access and the second random access succeed; and in accordance with a determination that the first random access fails and the second random access succeeds, causing the first device to reconnect to the second device.

In a third aspect, there is provided a method. The method comprises receiving, at a third device and from a second device, a request for adding the third device to provide a first device with dual connectivity; transmitting an acknowledgement comprising a second configuration about the third device to the second device, to enable the first device to perform random access to the third device based on the second configuration; determining whether the random access succeeds or fails; and transmitting a result of the determination to the second device.

In a fourth aspect, there is provided a first device. The first device comprises at least one processor and at least one memory including computer program codes. The at least one memory and the computer program codes are configured to, with the at least one processor, cause the first device to receive a connection reconfiguration message from a fourth device connected with first device, the connection reconfiguration message comprising a first configuration about a second device and a second configuration about a third device; perform first random access to the second device based on the first configuration and second random access to the third device based on the second configuration, to connect to the second device and the third device; and in response to failure of the first random access and success of the second random access, reconnect to the second device based on the first configuration while keeping connected to the third device.

In a fifth aspect, there is provided a second device. The second device comprises at least one processor and at least one memory including computer program codes. The at least one memory and the computer program codes are configured to, with the at least one processor, cause the second device to transmit, to a fourth device connected with a first device, a connection reconfiguration message comprising configurations about the second device and a third device to be connected with the first device, to enable the first device to perform first random access to the second device and second random access to the third device; determine whether the first random access and the second random access succeed; and in accordance with a determination that the first random access fails and the second random access succeeds, cause the first device to reconnect to the second device.

In a sixth aspect, there is provided a third device. The third device comprises at least one processor and at least one memory including computer program codes. The at least one memory and the computer program codes are configured to, with the at least one processor, cause the third device to receive, from a second device, a request for adding the third device to provide a first device with dual connectivity; transmit an acknowledgement comprising a second configuration about the third device to the second device, to enable the first device to perform random access to the third device based on the second configuration; determine whether the random access succeeds or fails; and transmit a result of the determination to the second device.

In a seventh aspect, there is provided an apparatus. The apparatus comprises means for receiving, at a first device, a connection reconfiguration message from a fourth device connected with first device, the connection reconfiguration message comprising a first configuration about a second device and a second configuration about a third device; means for performing first random access to the second device based on the first configuration and second random access to the third device based on the second configuration, to connect to the second device and the third device; and means for in response to failure of the first random access and success of the second random access, reconnecting to the second device based on the first configuration while keeping connected to the third device.

In an eighth aspect, there is provided an apparatus. The apparatus comprises means for transmitting, from a second device to a fourth device connected with a first device, a connection reconfiguration message comprising configurations about the second device and a third device to be connected with the first device, to enable the first device to perform first random access to the second device and second random access to the third device; means for determining whether the first random access and the second random access succeed; and means for in accordance with a determination that the first random access fails and the second random access succeeds, causing the first device to reconnect to the second device.

In a ninth aspect, there is provided an apparatus. The apparatus comprises means for receiving, at a third device and from a second device, a request for adding the third device to provide a first device with dual connectivity; means for transmitting an acknowledgement comprising a second configuration about the third device to the second device, to enable the first device to perform random access to the third device based on the second configuration; means for determining whether the random access succeeds or fails; and means for transmitting a result of the determination to the second device.

In a tenth aspect, there is provided a computer program product that is stored on a computer readable medium and includes machine-executable instructions. The machine-executable instructions, when being executed, cause a machine to perform the method according to the above first, second or third aspect.

In an eleventh aspect, there is a computer readable storage medium comprising program instructions stored thereon. The instructions, when executed by an apparatus, cause the apparatus to perform the method according to the above first, second or third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
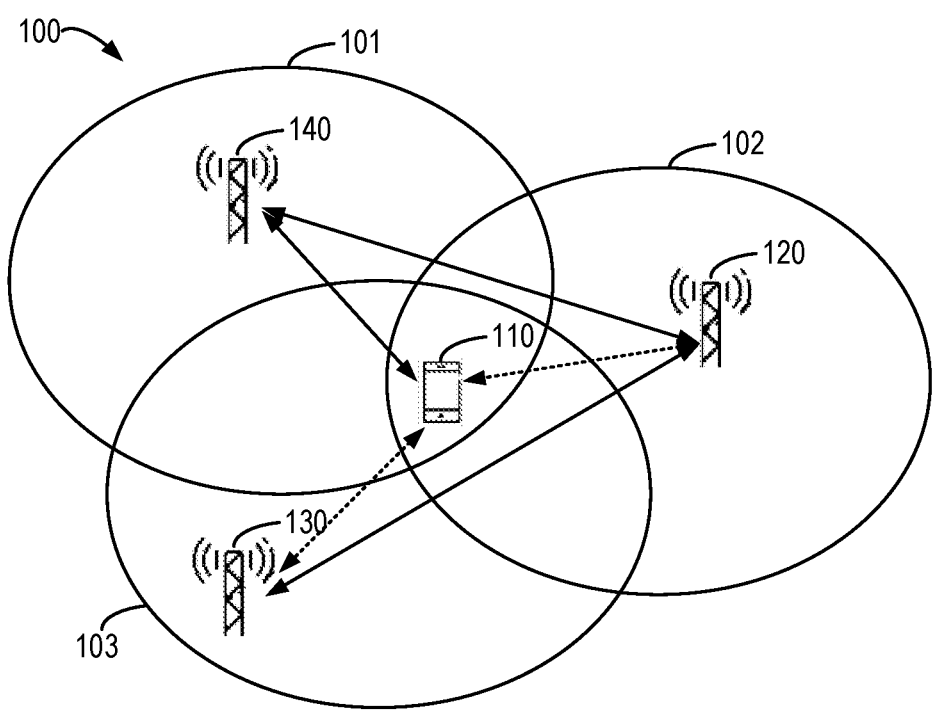
FIG. 1 illustrates an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As described above, in Release 15 (Rel-15) of 3GPP specifications, an inter-RAT handover (HO) to EN-DC is not supported. For example, a source gNB can only first hand over a UE from the gNB to a target eNB and then configure EN-DC by adding a secondary network device after the handover. It is desirable to introduce a direct inter-RAT handover from NR to EN-DC, which can reduce signaling overhead and ensure a consistent high data rate for eMBB services.

In the 3GPP specification TS 37.340 (10.9 eNB/gNB to Master Node change), in the procedure of a handover from an eNB to EN-DC, the current signaling requires that UE must complete the handover to a target master node (MN) first before completion of access to a secondary node (SN). This is performed by the following two steps: the target MN first receives an RRC connection reconfiguration complete message (to complete the handover), then the target MN informs the target SN of the handover success via an X2 message (a SgNB Reconfiguration Complete message) to add the target SN. In addition, the specification is not clear whether the UE can start access to the SN in parallel.

For a one-step handover to EN-DC, the target is to reduce the dual connectivity (DC) configuration latency and quickly recover the service data rate after the handover procedure. Some existing solution proposes performing random access to both the target MN and the target SN in parallel for fast SN activation in the HO to EN-DC. This solution confirms the problem that quick/parallel access is needed, but at the same time in case that the HO to Master Cell Group (MCG) fails, reverting user plane back (discarding the delivered downlink/uplink packets) is difficult in UE implementation, which wastes radio resources and power and thus should be avoided. The biggest issue in this solution is that it only considers the MCG failure case. There is no discussion about the case in which the SN can communication to the UE via signaling radio bearer 3 (SRB3) without existence of SRB1 and SRB2. Therefore, this solution is not a complete and workable solution.

Additionally, during the Rel-16 mobility enhancement work, the so-called Dual Active Protocol Stack (DAPS) handover is being specified. In that concept, UE may be communicating with both source and target cells at the same time, and if the target cell fails while the source cell communication is still ongoing, the UE can fall back to the source cell without re-establishment. However, in DAPS handover, the UE can establish a connection with a single target node anytime, but cannot establish connections to two target nodes simultaneously.

Embodiments of the present disclosure provide a solution for a handover to dual connectivity. According to embodiments of the present disclosure, a UE receives, from a source node, a connection reconfiguration message comprising configurations about a target MN and a target SN to be connected with the UE. The UE performs random access to the target MN and the target SN in parallel. If the UE successfully connects to the target SN but fails to connect to the target MN, the UE will reconnect to the target MN. In addition, the target SN indicates to the target MN a result (such as, success or failure) of the random access. For the target MN, different actions can be selected based on whether SRB3 exists between the target SN and the UE. As such, embodiments of the present disclosure can reduce signaling overhead and increase the success rate of the handover to dual connectivity.

FIG. 1 illustrates an example communication network 100 in which example embodiments of the present disclosure can be implemented. The communication network 100 includes a terminal device 110 and network devices 120, 130 and 140. Each of the network devices 120, 130 and 140 can provide one or more cells. As shown in FIG. 1, for example, the network device 120 may provide a cell 101, the network device 120 may provide a cell 102 and the network device 130 may provide a cell 103. It is to be understood that the number of network devices, terminal devices and/or cells is given for the purpose of illustration without suggesting any limitation to the scope of the present disclosure. The communication network 100 may include any suitable number of network devices, terminal devices and/or cells adapted for implementing implementations of the present disclosure.

In some example embodiments, some or all of the network devices 120, 130 and 140 may use a same RAT, for example, LTE, NR or so on. Alternatively, in some example embodiments, the network devices 120, 130 and 140 may use different RATs. For example, the network device 140 may be a gNB, while the network devices 130 and 140 are both eNBs. For another example, the network devices 120, 130 and 140 may be all gNBs. For another example, the network devices 120 and the network device 140 are gNBs, while the network device 130 is an eNB. It is to be understood that the scope of the present disclosure is not limit in this aspect.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

As shown in FIG. 1, initially, the terminal device 110 may connect to the network device 140, which is also referred to a "source network device" or "source node" in the following. The source node 140 may initiate a handover to dual connectivity by transmitting a handover request to the network device 120 acting as a target master network device. The network device 120 may be also referred to as a "target master network device" or "target master node (T-MN)" in the following. To provide the terminal device 110 with dual connectivity, the T-MN 120 may select the network device 130 as a target secondary network device and transmit a request (for example, a SgNB addition request) for adding the network device 130 as the target secondary network device. The network device 130 may be also referred to as a "target secondary network device" or "target secondary node (T-SN)" in the following. The T-SN 130 may feedback an acknowledgement (for example, a SgNB addition request acknowledgement) comprising a configuration about Secondary Cell Group (SCG) to the T-MN 120. The T-MN 120 may transmit, to the source node 140, a handover request acknowledgement comprising configurations about both the T-MN 120 and the T-SN 130. The source node 140 may transmit a connection reconfiguration message (for example, an RRC connection reconfiguration message) comprising the configurations about both the T-MN 120 and the T-SN 130 to the terminal device 110.

In some example embodiments, the terminal device 110 may perform random access to the T-MN 120 and the T-SN 130 in parallel based on the configurations received from the source node 140. Regarding the T-SN 130, it may transmit, to the T-MN 120, a result of the random access, such as, via an X2/Xn interface. For example, the result may indicate whether the random access to the T-SN 130 performed by the terminal device 110 succeeds or fails.

Regarding the T-MN 120, in some example embodiments, if the terminal device 110 successfully accesses the T-MN 120, the T-MN 120 may perform normal actions to complete the handover procedure, as in the legacy solutions. If the T-MN 120 receives from the T-SN 130 an indication that the random access to the T-SN 130 performed by the terminal device 110 succeeds, the T-SN 130 may treat the handover as partial success and relative UE contexts may be established. If the T-MN 120 receives from the T-SN 130 an indication that the random access to the T-SN 130 performed by the terminal device 110 succeeds but the terminal device 110 fails to access the T-MN 120 (for example, the T304 timer of the T-MN 120 expires), different actions can be selected based on whether SRB3 exists between the T-SN 130 and the terminal device 110.

In some example embodiments, if SRB3 is established between the T-SN 130 and the terminal device 110 and if the T-MN 120 receives an indication of the existence of SRB3, the T-MN 120 may determine that the handover fails and transmit a request for releasing the target secondary node to the T-SN 130. Then the T-SN 130 may transmit a connection release message (such as, an RRC release message) to the terminal device 110 via SRB3. In some example embodiments, if no SRB3 exists between the T-SN 130 and the terminal device 110 or if the T-MN 120 does not receive an indication of the existence of SRB3, the T-SN 130 may maintain the connection with the terminal device 110 and the T-MN 120 may wait for a connection reestablishment message (such as, an RRC reestablishment message) from the terminal device 110. To facilitate this, in some example embodiments, upon reception of the SgNB addition request acknowledgement from the T-SN 130, the T-MN 120 may initiate a timer with a longer expiration time to monitor the connection reestablishment message from the terminal device 110.

Regarding the terminal device 110, in some example embodiments, if the terminal device 110 successfully accesses the T-SN 130 but fails to access the T-MN 120 (for example, the T304 timer of the T-MN 120 expires), the terminal device 110 may reconnect to the T-MN 120 based on the configuration about the T-MN 120 received via the connection reconfiguration message. The reconnection to the T-MN 120 may be performed in several ways.

In some example embodiments, after timeout of the T304 timer, the terminal device 110 may initiate a new timer with an expiration time of N*t304, where t304 represents the original expiration time of the T304 timer and N>0. Once the new timer is initiated, the terminal device 110 may try to reconnect to the T-MN 120 in each time period (for example, one or more times of t304) of the new timer. If the terminal device 110 has tried to reconnect to the T-MN 120 for N times but all fails, that is, the new timer expires, the terminal device 110 may fall back to the source node 140 configured with a configuration to do cell selection. In some example embodiments, the expiration time of the new timer may be configured to the terminal device 110 by the T-MN 120 in the handover request acknowledgement including information element(s) indicating values of t304 and N, or indicating the value of t304 and a new expiration time (for example, equal to N*t304) for the new timer. Alternatively, in some example embodiments, the expiration time of the new timer may be configured to the terminal device 110 by the T-MN 120 in a reconfiguration message (for example, an RRC reconfiguration message) transmitted from the T-SN 130 via SRB3 (if it exists). For example, the reconfiguration message may include information element(s) indicating values of t304 and N, or indicating the value of t304 and a new expiration tome (for example, equal to N*t304) for the new timer.

Alternatively, in some example embodiments, after timeout of the T304 timer, the terminal device 110 may perform cell selection. Upon selecting the cell 102 provided by the T-MN 120 as a suitable cell, the terminal device 110 may transmit a connection reestablishment request (for example, an RRC connection reestablishment request) to the T-MN 120 by using Cell-Radio Network Temporary Identifier (C-RNTI) and a physical cell identity allocated to the T-MN 120. Otherwise, the terminal device 110 may fall back to the source node 140. In some example embodiments, if the terminal device 110 receives a connection release message (such as, an RRC release message) from the T-SN 130 via SRB3 (if configured) during the re-connection to the T-MN 120, the terminal device 110 may fall back to the source node 140 after looking for any possible cells.

Regarding the source node 140, in some example embodiments, all resources allocated to the terminal device 110 may be remained until a UE context release message is received from the T-MN 120 or the terminal device 110 successfully reconnects to the source node 140. After the terminal device 110 successfully reconnects to the source node 140, the source node 140 may inform the T-MN 120 of the handover failure. Regarding the source node 140 and two target nodes 120 and 130, early data forwarding during the handover and forwarding data retrieved from the target node to the source node 140 when the handover failure occurs can be perform in a similar way as the legacy solutions.

Figure 2:
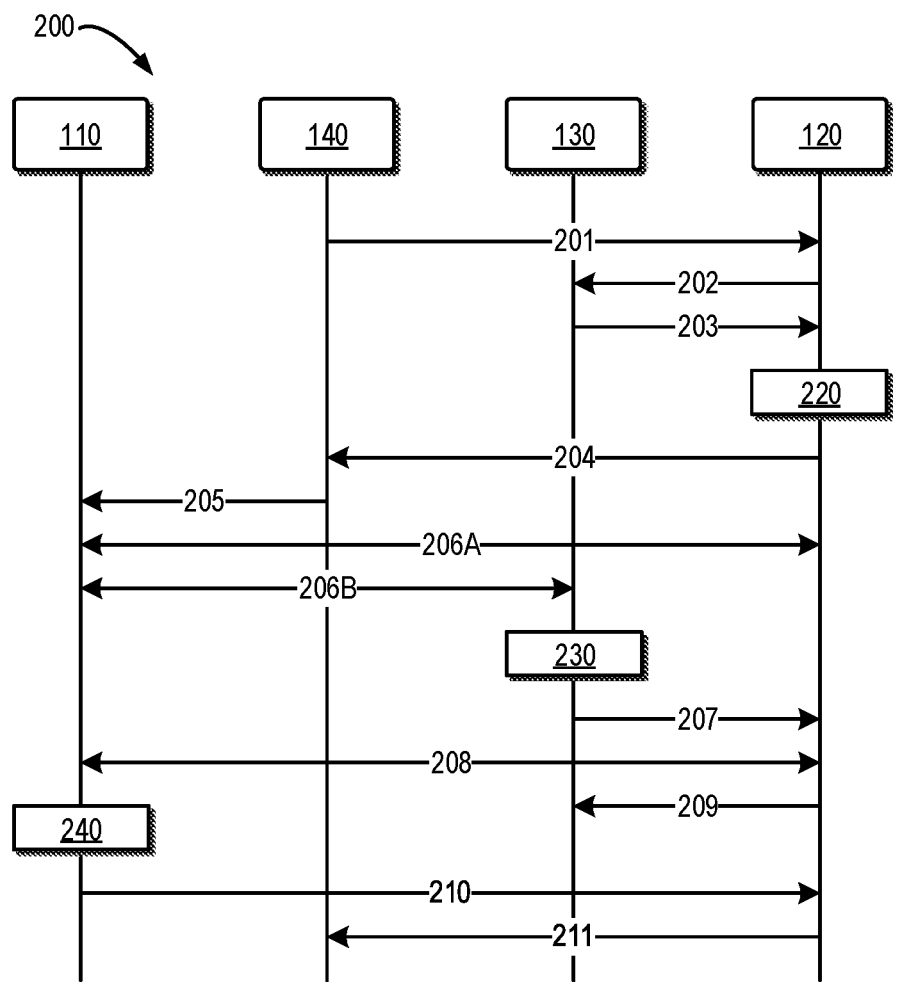
FIG. 2 illustrates a schematic diagram of interactions between devices according to according to some example embodiments of the present disclosure.

FIG. 2 illustrates a schematic diagram of interactions 200 between devices according to according to some example embodiments of the present disclosure. The interactions 200 may be implemented at any suitable devices. Only for the purpose of illustration, in the following, the interactions 200 will be described with reference to the UE 110, the T-MN 120, the T-SN 130 and the source node 140.

As shown in FIG. 2, the source node 140 may transmit 201 a handover request to the T-MN 120 to initiate a handover. In some example embodiments, according to respective RATs used by the source node 140, the T-MN 120 and the T-SN 130, the handover may be an inter-RAT or intra-RAT handover.

In response to the handover request from the source node 140, the T-MN 120 may select the node 130 as the T-SN and transmit 202 a request (for example, a SgNB addition request) for adding the node 130 as the T-SN. The T-SN 130 may feedback 203 an acknowledgement (for example, a SgNB addition request acknowledgement) comprising a configuration about SCG to the T-MN 120. Only for the purpose of illustration, it is assumed that the acknowledgement comprises no SRB3 configuration.

Upon reception of the acknowledgement, the T-MN 120 may initiate 220 a timer to monitor random access from the terminal device 110. The T-MN 120 may transmit 204, to the source node 140, a handover request acknowledgement comprising configurations about both the T-MN 120 and the T-SN 130. Since the T-MN 120 receives no SRB3 configuration from the T-SN 130, the handover request acknowledgement may comprise no SRB3 configuration here. The source node 140 may transmit 205 a connection reconfiguration message (for example, an RRC connection reconfiguration message) comprising the configurations about both the T-MN 120 and the T-SN 130 to the terminal device 110. The connection reconfiguration message may comprise no SRB3 configuration.

Upon reception of the configurations about both the T-MN 120 and the T-SN 130 via the connection reconfiguration message which includes no SRB3 configuration, the UE 110 may perform first random access 206A to the T-MN 120 and second random access 206B to the T-SN 130 in parallel. It is assumed that the second random access to the T-SN 130 succeeds 230 while no SRB3 is established. The T-SN 130 may transmit 207, to the T-MN 120, a result indicating the success of the second random access. In this case, since no SRB3 is established, the result may also comprise an indication that no SRB3 is established.

It is also assumed that the first random access to the T-MN 120 fails, and thus the UE 110 may reconnect 208 to the T-MN 120 based on the configuration indicated in the connection reconfiguration message. For example, the UE 110 may transmit a connection reestablishment message (for example, an RRC connection reestablishment message) to the T-MN 120. In response to the connection reestablishment message being transmitted, the terminal device 110 may initiate 240 a timer to monitor a result of the reconnection. The T-MN 120 may wait for the connection reestablishment message from the UE 110 until its timer initiated at 220 expires. In response to success of the reconnection to the T-MN 120, the T-MN 120 may transmit 209 a reconfiguration complete message (for example, a SgNB reconfiguration complete message) to the T-SN 130. In response to success of the reconnection to the T-MN 120, the UE 110 may transmit 210 a connection reconfiguration complete message to the T-MN 120 and the T-MN 120 may transmit 211 a UE context release message to the source node 140.

Figure 3:
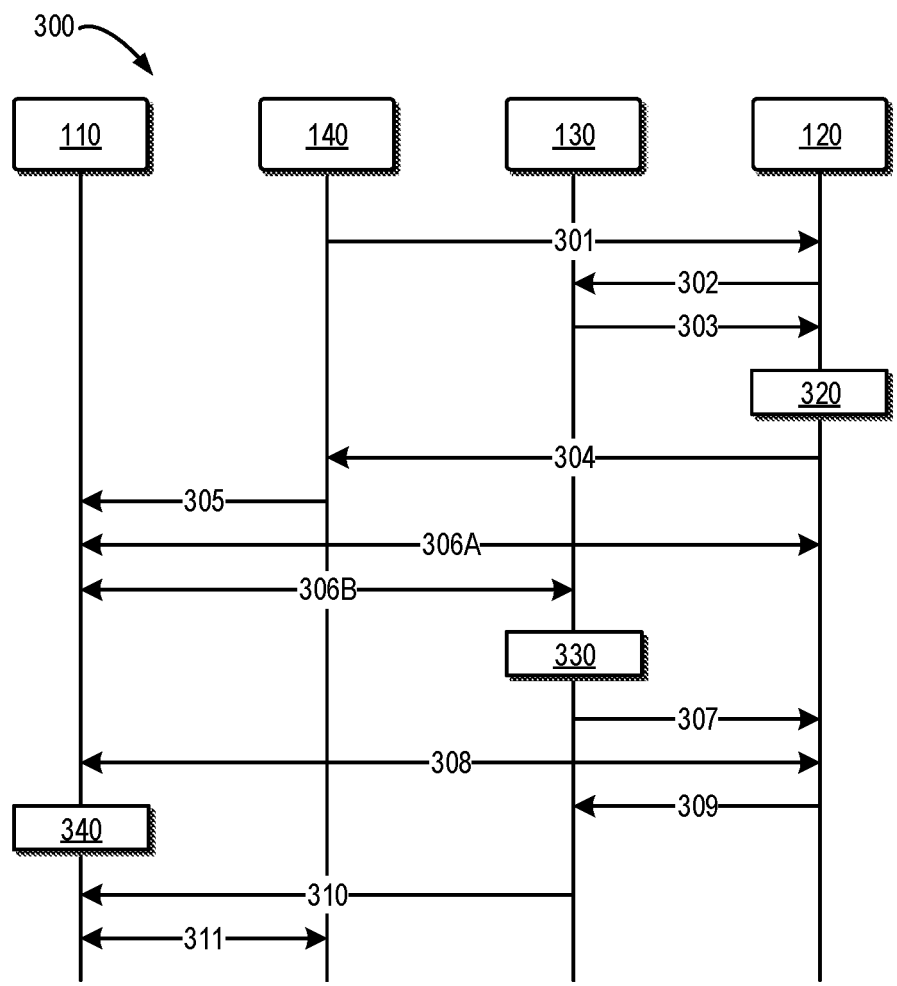
FIG. 3 illustrates a schematic diagram of interactions between devices according to according to some example embodiments of the present disclosure.

FIG. 3 illustrates a schematic diagram of interactions 300 between devices according to according to some example embodiments of the present disclosure. The interactions 300 may be implemented at any suitable devices. Only for the purpose of illustration, in the following, the interactions 300 will be described with reference to the UE 110, the T-MN 120, the T-SN 130 and the source node 140.

As shown in FIG. 3, the source node 140 may transmit 301 a handover request to the T-MN 120 to initiate a handover. In some example embodiments, according to respective RATs used by the source node 140, the T-MN 120 and the T-SN 130, the handover may be an inter-RAT or intra-RAT handover.

In response to the handover request from the source node 140, the T-MN 120 may select the node 130 as the T-SN and transmit 302 a request (for example, a SgNB addition request) for adding the node 130 as the T-SN. The T-SN 130 may feedback 303 an acknowledgement (for example, a SgNB addition request acknowledgement) comprising a configuration about SCG to the T-MN 120. Only for the purpose of illustration, it is assumed that the acknowledgement comprises an SRB3 configuration.

Upon reception of the acknowledgement, the T-MN 120 may initiate 320 a timer to monitor random access from the terminal device 110. The T-MN 120 may transmit 304, to the source node 140, a handover request acknowledgement comprising configurations about both the T-MN 120 and the T-SN 130. Since the T-MN 120 receives the SRB3 configuration from the T-SN 130, the T-MN 120 may forward the SRB3 configuration to the source node 140 via the handover request acknowledgement. The source node 140 may transmit 305 a connection reconfiguration message (for example, an RRC connection reconfiguration message) comprising the configurations about both the T-MN 120 and the T-SN 130 to the terminal device 110. The connection reconfiguration message may also comprise the SRB3 configuration.

Upon reception of the configurations about both the T-MN 120 and the T-SN 130 via the connection reconfiguration message which includes no SRB3 configuration, the UE 110 may perform first random access 306A to the T-MN 120 and second random access 306B to the T-SN 130 in parallel. It is assumed that the second random access to the T-SN 130 succeeds 330 with SRB3 being established between the T-SN 130 and the UE 110 based on the SRB3 configuration. The T-SN 130 may transmit 307, to the T-MN 120, a result indicating the success of the second random access. In this case, since SRB3 has been established, the result may also comprise an indication that SRB3 has been established.

It is also assumed that the first random access to the T-MN 120 fails, and thus the UE 110 may reconnect 308 to the T-MN 120 based on the configuration indicated in the connection reconfiguration message. For example, the UE 110 may transmit a connection reestablishment message (for example, an RRC connection reestablishment message) to the T-MN 120. In response to the connection reestablishment message being transmitted, the terminal device 110 may initiate 340 a timer to monitor a result of the reconnection. Since SRB3 exists, the T-MN 120 may instruct 309 the T-SN 130 to release the UE 110. For example, the T-MN 120 may transmit a release request (for example, an SgNB release request) to the T-SN 130. The T-SN 130 may then transmit a connection release message (for example, an RRC connection release message) to the UE 110 via SRB3. In response to the connection release message from the T-SN 130, the UE 110 reconnects 311 to the source node 140.

Figure 4:
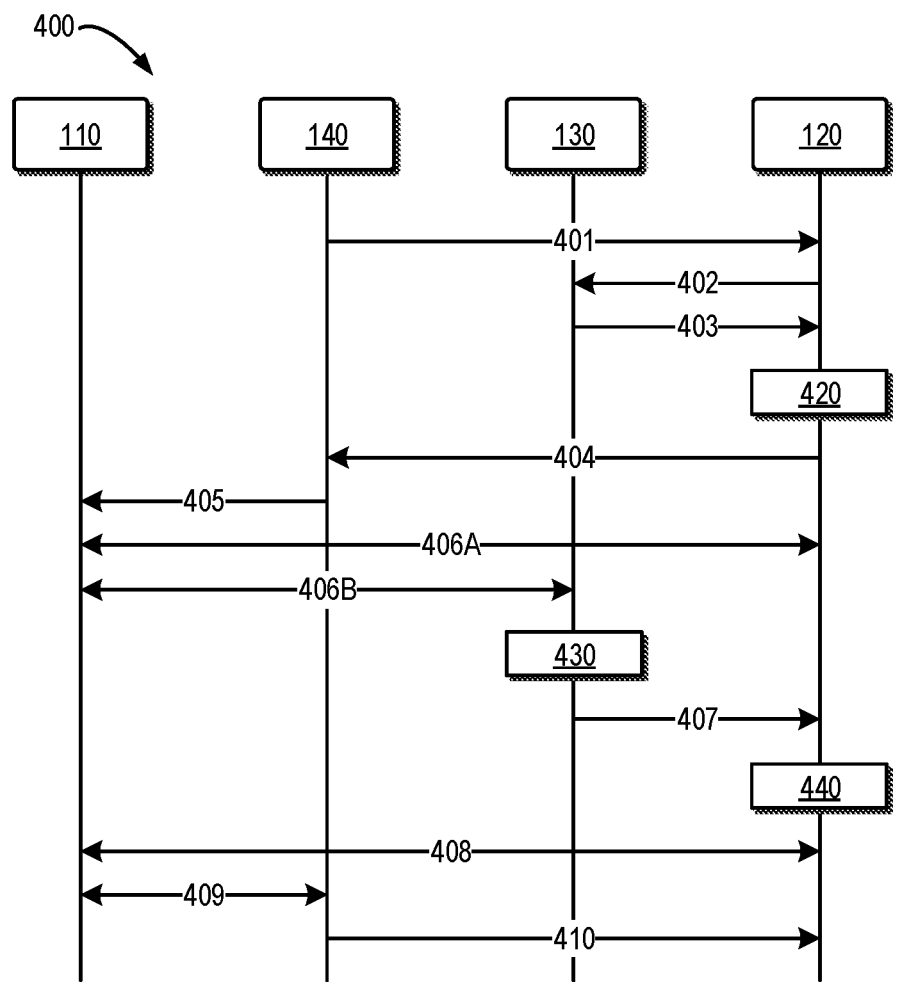
FIG. 4 illustrates a schematic diagram of interactions between devices according to according to some example embodiments of the present disclosure.

FIG. 4 illustrates a schematic diagram of interactions 400 between devices according to according to some example embodiments of the present disclosure. The interactions 400 may be implemented at any suitable devices. Only for the purpose of illustration, in the following, the interactions 400 will be described with reference to the UE 110, the T-MN 120, the T-SN 130 and the source node 140.

As shown in FIG. 4, the source node 140 may transmit 401 a handover request to the T-MN 120 to initiate a handover. In some example embodiments, according to respective RATs used by the source node 140, the T-MN 120 and the T-SN 130, the handover may be an inter-RAT or intra-RAT handover.

In response to the handover request from the source node 140, the T-MN 120 may select the node 130 as the T-SN and transmit 402 a request (for example, a SgNB addition request) for adding the node 130 as the T-SN. The T-SN 130 may feedback 403 an acknowledgement (for example, a SgNB addition request acknowledgement) comprising a configuration about SCG to the T-MN 120. Only for the purpose of illustration, it is assumed that the acknowledgement comprises no SRB3 configuration.

Upon reception of the acknowledgement, the T-MN 120 may initiate 420 a timer to monitor random access from the terminal device 110. The T-MN 120 may transmit 404, to the source node 140, a handover request acknowledgement comprising configurations about both the T-MN 120 and the T-SN 130. Since the T-MN 120 receives no SRB3 configuration from the T-SN 130, the handover request acknowledgement may comprise no SRB3 configuration here. The source node 140 may transmit 405 a connection reconfiguration message (for example, an RRC connection reconfiguration message) comprising the configurations about both the T-MN 120 and the T-SN 130 to the terminal device 110. The connection reconfiguration message may comprise no SRB3 configuration.

Upon reception of the configurations about both the T-MN 120 and the T-SN 130 via the connection reconfiguration message which includes no SRB3 configuration, the UE 110 may perform first random access 406A to the T-MN 120 and second random access 406B to the T-SN 130 in parallel. It is assumed that the second random access to the T-SN 130 succeeds 430 while no SRB3 is established. The T-SN 130 may transmit 407, to the T-MN 120, a result indicating the success of the second random access. In this case, since no SRB3 is established, the result may also comprise an indication that no SRB3 is established.

It is also assumed that the first random access to the T-MN 120 fails, and thus the UE 110 may reconnect 408 to the T-MN 120 based on the configuration indicated in the connection reconfiguration message. For example, the UE 110 may transmit a connection reestablishment message (for example, an RRC connection reestablishment message) to the T-MN 120. The T-MN 120 may wait 440 for the connection reestablishment message from the UE 110 until its timer initiated at 220 expires. It is assumed here the timer of the T-MN 120 expires and thus the reconnection to the T-MN 120 fails. In response to failure of the reconnection to the T-MN 120, the UE 110 may reconnect 409 to the source node 140. The source node 140 may transmit 410 an indication of the handover failure to the T-MN 120.

In view of the above, it can be seen that embodiments of the present disclosure support random access to the T-MN and the T-SN in parallel in a direct inter-RAT or intra-RAT handover to dual connectivity. Embodiments of the present disclosure can reduce signaling overhead and increase the success rate of the handover to dual connectivity by enabling the UE to reconnect to the T-MN while maintaining the connection with the T-SN.

Figure 5:
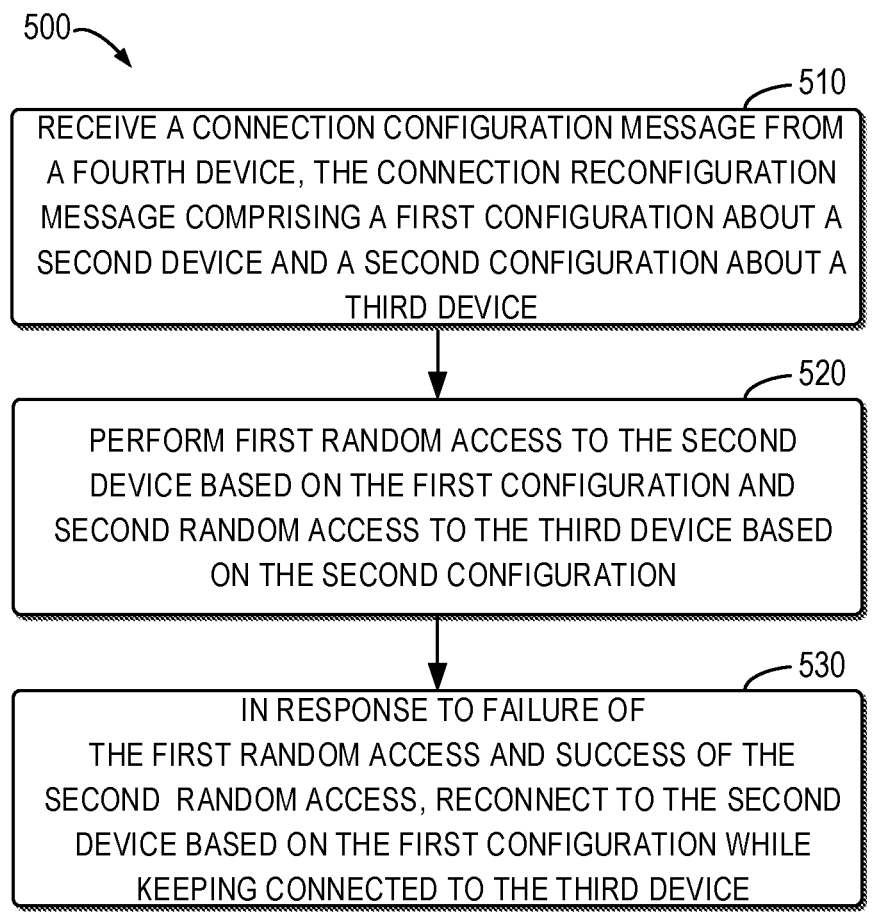
FIG. 5 illustrates a flowchart of an example method for a handover to dual connectivity according to some example embodiments of the present disclosure.

FIG. 5 shows a flowchart of an example method 500 for a handover to dual connectivity in accordance with some example embodiments of the present disclosure. The method 500 can be implemented at the terminal device 110 as shown in FIG. 1. For the purpose of discussion, the method 500 will be described from the perspective of the terminal device 110 with reference to FIG. 1. In the following, the terminal device 110 is also referred to as a "first device 110", the target master network device 120 is also referred to as a "second device 120", the target secondary network device 130 is also referred to as a "third device 130" and the source network device 140 is also referred to as a "fourth device 140". It is to be understood that the method 500 may include additional blocks not shown and/or may omit some shown blocks, and the scope of the present disclosure is not limited in this regard.

At block 510, the first device 110 receives a connection reconfiguration message from the fourth device 140. The connection reconfiguration message may comprise a first configuration about the second device 120 and a second configuration about the third device 130.

At block 520, the first device 110 performs first random access to the second device 120 based on the first configuration and second random access to the third device 130 based on the second configuration to connect to the second device 120 and the third device 130.

At block 530, in response to failure of the first random access and success of the second random access, the first device 110 reconnects to the second device 120 based on the first configuration while keeping connected to the third device 130.

In some example embodiments, the connection reconfiguration message comprises a configuration about a signaling radio bearer between the third device 130 and the first device 110. In some example embodiments, in response to receiving a connection release message from the third device 130 via the signaling radio bearer, the first device 110 disconnects from the third device 130, and reconnects to the fourth device 140 or connects to a fifth device discovered in cell selection initiated by the first device 110.

In some example embodiments, the first device 110 may reconnect to the second device 120 by transmitting a connection reestablishment message to the second device 120; or performing third random access to the second device 120 based on the first configuration.

In some example embodiments, the first device 110 determines whether the reconnection to the second device 120 fails. In accordance with a determination that the reconnection to the second device 120 fails, the first device 110 reconnects to the fourth device 140 or connects to a fifth device discovered in cell selection initiated by the first device 110.

In some example embodiments, the first device 110 determines whether the reconnection to the second device 120 by: initiating a timer to monitor success of the reconnection to the second device 120; and in response to timeout of the timer, determining that the reconnection to the second device 120 fails.

In some example embodiments, the first device 110 receives a configuration about the timer via one of the following: the connection reconfiguration message; or a reconfiguration message transmitted from the third device via a signaling radio bearer.

In some example embodiments, the first device 110 comprises a terminal device, the second device 120 comprises a target master network device, the third device 130 comprises a target secondary network device, and the fourth device 140 comprises a source network device which initiates a handover of the terminal device to the target master network device and the target secondary network device.

Figure 6:
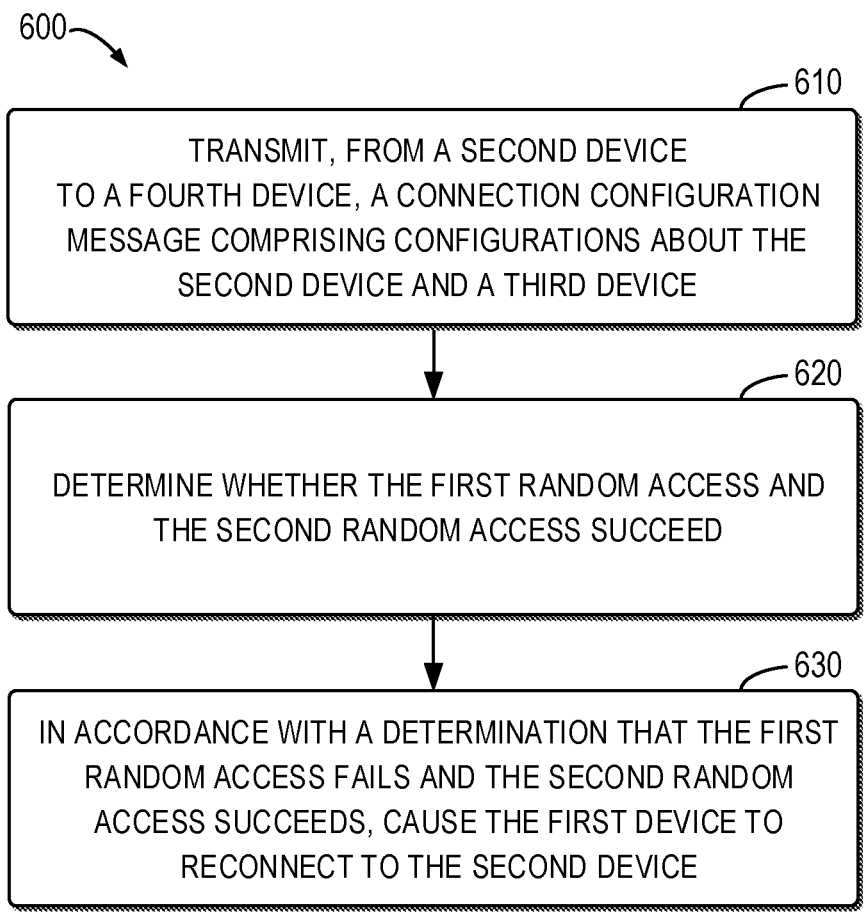
FIG. 6 illustrates a flowchart of an example method for a handover to dual connectivity in accordance with some example embodiments of the present disclosure.

FIG. 6 shows a flowchart of an example method 600 for a handover to dual connectivity in accordance with some example embodiments of the present disclosure. The method 600 can be implemented at the target master network device 120 as shown in FIG. 1. For the purpose of discussion, the method 600 will be described from the perspective of the target master network device 120 with reference to FIG. 1. In the following, the terminal device 110 is also referred to as the "first device 110", the target master network device 120 is also referred to as the "second device 120", the target secondary network device 130 is also referred to as the "third device 130" and the source network device 140 is also referred to as the "fourth device 140". It is to be understood that the method 600 may include additional blocks not shown and/or may omit some shown blocks, and the scope of the present disclosure is not limited in this regard.

At block 610, the second device 120 transmits, to the fourth device 140 connected with the first device 110, a connection reconfiguration message comprising configurations about the second device 120 and a third device 130 to be connected with the first device 110, to enable the first device 110 to perform first random access to the second device 120 and second random access to the third device 130.

In some example embodiments, prior to transmitting the connection reconfiguration message to the fourth device 140, the second device 120 transmits, to the third device 130, a request for adding the third device 130 to provide the first device 110 with dual connectivity. The second device 120 receives, from the third device 130, an acknowledgement comprising the second configuration.

In some example embodiments, the connection reconfiguration message comprises a configuration about a first timer to be used by the first device 110 to monitor the reconnection to the second device 120.

At block 620, the second device 120 determines whether the first random access and the second random access succeed.

In some example embodiments, the second device 120 determines whether the first random access succeeds by: in response to receiving the acknowledgement from the third device 130, initiate a second timer to monitor success of the first random access; and in response to timeout of the timer, determining that the first random access fails.

In some example embodiments, a first expiration time of the first timer is the same as a second expiration time of the second timer. Alternatively, in some example embodiments, the first expiration time is different from the second expiration time. For example, the first expiration time may be shorter or longer than the second expiration time.

In some example embodiments, the second device 120 determines whether the second random access succeeds by: obtaining a result of the second random access from the third device 130, the result indicating whether the second random access succeeds or fails.

In some example embodiments, the acknowledgement comprises no configuration about a signaling radio bearer between the third device 130 and the first device 110, and the result comprises an indication that no signaling radio bearer is established.

In some example embodiments, the acknowledgement comprises a configuration about a signaling radio bearer to be established between the third device 130 and the first device 110, and the result comprises an indication that the signaling radio bearer has been established based on the configuration.

At block 630, in accordance with a determination that the first random access fails and the second random access successes, the second device 120 causes the first device 110 to reconnect to the second device 120.

In some example embodiments, the second device 120 further transmits, to the third device 130, a request for releasing a connection between the third device 130 and the first device 110, such that the third device 130 transmits a connection release message to the first device 110 via the signaling radio bearer.

In some example embodiments, the second device 120 further transmits, to the third device 130, a request for reconfiguring the first timer, such that the third device 130 transmits a reconfiguration message for reconfiguring the first timer to the first device 110 via the signaling radio bearer.

In some example embodiments, the first device 110 comprises a terminal device, the second device 120 comprises a target master network device, the third device 130 comprises a target secondary network device, and the fourth device 140 comprises a source network device which initiates a handover of the terminal device to the target master network device and the target secondary network device.

Figure 7:
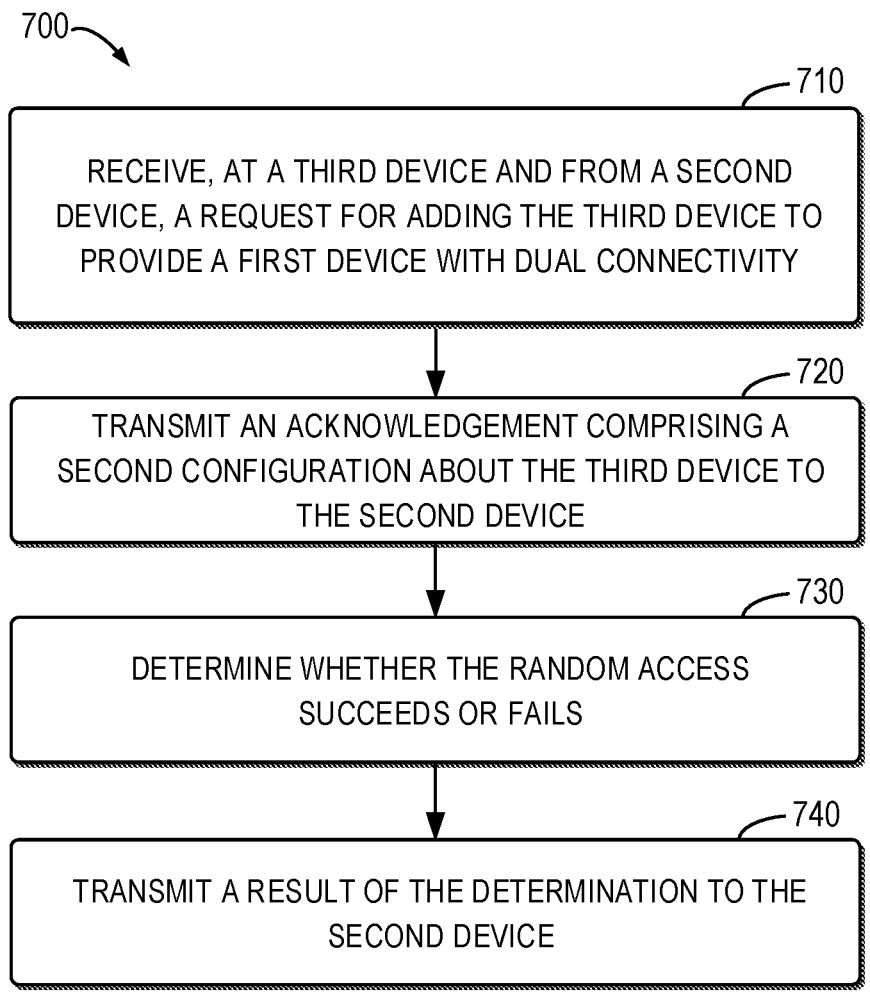
FIG. 7 illustrates a flowchart of an example method for a handover to dual connectivity in accordance with some example embodiments of the present disclosure.

FIG. 7 shows a flowchart of an example method 700 for a handover to dual connectivity in accordance with some example embodiments of the present disclosure. The method 700 can be implemented at the target secondary network device 130 as shown in FIG. 1. For the purpose of discussion, the method 700 will be described from the perspective of the target secondary network device 130 with reference to FIG. 1. In the following, the terminal device 110 is also referred to as the "first device 110", the target master network device 120 is also referred to as the "second device 120", the target secondary network device 130 is also referred to as the "third device 130" and the source network device 140 is also referred to as the "fourth device 140". It is to be understood that the method 700 may include additional blocks not shown and/or may omit some shown blocks, and the scope of the present disclosure is not limited in this regard.

At block 710, the third device 130 receives, from the second device 120, a request for adding the third device 130 to provide the first device 110 with dual connectivity.

At block 720, the third device 130 transmits an acknowledgement comprising a second configuration about the third device 130 to the second device 120, to enable the first device 110 to perform random access to the third device 130 based on the second configuration.

At block 730, the third device 130 determines whether the random access succeeds or fails.

At block 740, the third device 130 transmits a result of the determination to the second device 120.

In some example embodiments, the acknowledgement comprises no configuration about a signaling radio bearer between the third device 130 and the first device 110, and the result comprises an indication that no signaling radio bearer is established.

In some example embodiments, the acknowledgement comprises a configuration about a signaling radio bearer to be established between the third device 130 and the first device 110. In response to success of the random access, the third device 130 establishes the signaling radio bearer between the third device 130 and the first device 110 based on the configuration.

In some example embodiments, the third device 130 transmits the result to the second device 120 by: in response to the signaling radio bearer being established between the third device 130 and the first device 110, transmitting the result comprising an indication that the signaling radio bearer has been established to the second device 120.

In some example embodiments, in response to receiving a request for releasing a connection between the third device 130 and the first device 110 from the second device 120, the third device 130 transmits a connection release message to the first device 110 via the signaling radio bearer.

In some example embodiments, the first device 110 is configured with a timer. In response to receiving a request for reconfiguring the timer of the first device 110 from the second device 120, the third device 130 transmits a reconfiguration message for reconfiguring the timer of the first device 110 to the first device 110 via the signaling radio bearer.

In some example embodiments, the first device 110 comprises a terminal device, the second device 120 comprises a target master network device, the third device 130 comprises a target secondary network device, and the fourth device 140 comprises a source network device which initiates a handover of the terminal device to the target master network device and the target secondary network device.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 (for example, the terminal device 110) comprises: means for receiving, at the first device, a connection reconfiguration message from a fourth device connected with first device, the connection reconfiguration message comprising a first configuration about a second device and a second configuration about a third device; means for performing first random access to the second device based on the first configuration and second random access to the third device based on the second configuration, to connect to the second device and the third device; and means for in response to failure of the first random access and success of the second random access, reconnecting to the second device based on the first configuration while keeping connected to the third device.

In some example embodiments, the connection reconfiguration message comprises a configuration about a signaling radio bearer between the third device and the first device and the apparatus capable of performing the method 500 further comprises: means for in response to receiving a connection release message from the third device via the signaling radio bearer, disconnecting from the third device; and means for reconnecting to the fourth device or connecting to a fifth device discovered in cell selection initiated by the first device.

In some example embodiments, the means for reconnecting to the second device comprises: means for transmitting a connection reestablishment message to the second device;

or means for performing third random access to the second device based on the first configuration.

In some example embodiments, the apparatus capable of performing the method 500 further comprises: means for determining whether the reconnection to the second device fails; and means for in accordance with a determination that the reconnection to the second device fails, reconnecting to the fourth device or connecting to a fifth device discovered in cell selection initiated by the first device.

In some example embodiments, the means for determining whether the reconnection to the second device fails comprises: means for initiating a timer to monitor success of the reconnection to the second device; and means for in response to timeout of the timer, determining that the reconnection to the second device fails.

In some example embodiments, the apparatus capable of performing the method 500 further comprises: means for receiving a configuration about the timer via one of the following: the connection reconfiguration message; or a reconfiguration message transmitted from the third device via a signaling radio bearer.

In some example embodiments, the first device comprises a terminal device, the second device comprises a target master network device, the third device comprises a target secondary network device, and the fourth device comprises a source network device which initiates a handover of the terminal device to the target master network device and the target secondary network device.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 (for example, the target master network device 120) comprises: means for transmitting, from a second device to a fourth device connected with a first device, a connection reconfiguration message comprising configurations about the second device and a third device to be connected with the first device, to enable the first device to perform first random access to the second device and second random access to the third device; means for determining whether the first random access and the second random access succeed; and means for in accordance with a determination that the first random access fails and the second random access succeeds, causing the first device to reconnect to the second device.

In some example embodiments, the connection reconfiguration message comprises a configuration about a first timer to be used by the first device to monitor the reconnection to the second device.

In some example embodiments, the apparatus capable of performing the method 600 further comprises: means for prior to transmitting the connection reconfiguration message to the fourth device, transmitting, to the third device, a request for adding the third device to provide the first device with dual connectivity; and means for receiving, from the third device, an acknowledgement comprising the second configuration.

In some example embodiments, the means for determining whether the first random access succeeds comprises: means for in response to receiving the acknowledgement from the third device, initiate a second timer to monitor success of the first random access; and means for in response to timeout of the timer, determining that the first random access fails.

In some example embodiments, the means for determining whether the second random access succeeds comprises: means for obtaining a result of the second random access from the third device, the result indicating whether the second random access succeeds or fails.

In some example embodiments, the acknowledgement comprises no configuration about a signaling radio bearer between the third device and the first device, and the result comprises an indication that no signaling radio bearer is established.

In some example embodiments, the acknowledgement comprises a configuration about a signaling radio bearer to be established between the third device and the first device, and the result comprises an indication that the signaling radio bearer has been established based on the configuration.

In some example embodiments, the apparatus capable of performing the method 600 further comprises: means for transmitting, to the third device, a request for releasing a connection between the third device and the first device, such that the third device transmits a connection release message to the first device via the signaling radio bearer.

In some example embodiments, the connection reconfiguration message comprises a configuration about a first timer to be used by the first device to monitor the reconnection to the second device, and the apparatus capable of performing the method 600 further comprises: means for transmitting, to the third device, a request for reconfiguring the first timer, such that the third device transmits a reconfiguration message for reconfiguring the first timer to the first device via the signaling radio bearer.

In some example embodiments, the first device comprises a terminal device, the second device comprises a target master network device, the third device comprises a target secondary network device, and the fourth device comprises a source network device which initiates a handover of the terminal device to the target master network device and the target secondary network device.

In some example embodiments, an apparatus capable of performing the method 700 may comprise means for performing the respective steps of the method 700. The means may be implemented in any suitable form. For example, the means may be implemented in a circuitry or software module.

In some example embodiments, the apparatus capable of performing the method 700 (for example, the target secondary network device 130) comprises: means for receiving, at a third device and from a second device, a request for adding the third device to provide a first device with dual connectivity; means for transmitting an acknowledgement comprising a second configuration about the third device to the second device, to enable the first device to perform random access to the third device based on the second configuration; means for determining whether the random access succeeds or fails; and means for transmitting a result of the determination to the second device.

In some example embodiments, the acknowledgement comprises no configuration about a signaling radio bearer between the third device and the first device, and the result comprises an indication that no signaling radio bearer is established.

In some example embodiments, the acknowledgement comprises a configuration about a signaling radio bearer to be established between the third device and the first device. The apparatus capable of performing the method 700 further comprises: means for in response to success of the random access, establishing the signaling radio bearer between the third device and the first device based on the configuration.

In some example embodiments, the means for transmitting the result to the second device comprises: means for in response to the signaling radio bearer being established between the third device and the first device, transmitting the result comprising an indication that the signaling radio bearer has been established to the second device.

In some example embodiments, the apparatus capable of performing the method 700 further comprises: means for in response to receiving a request for releasing a connection between the third device and the first device from the second device, transmitting a connection release message to the first device via the signaling radio bearer.

In some example embodiments, the first device is configured with a timer, and the apparatus capable of performing the method 700 further comprises: means for in response to receiving a request for reconfiguring the timer of the first device from the second device, transmitting a reconfiguration message for reconfiguring the timer of the first device to the first device via the signaling radio bearer.

In some example embodiments, the first device comprises a terminal device, the second device comprises a target master network device, the third device comprises a target secondary network device, and the fourth device comprises a source network device which initiates a handover of the terminal device to the target master network device and the target secondary network device.

Figure 8:
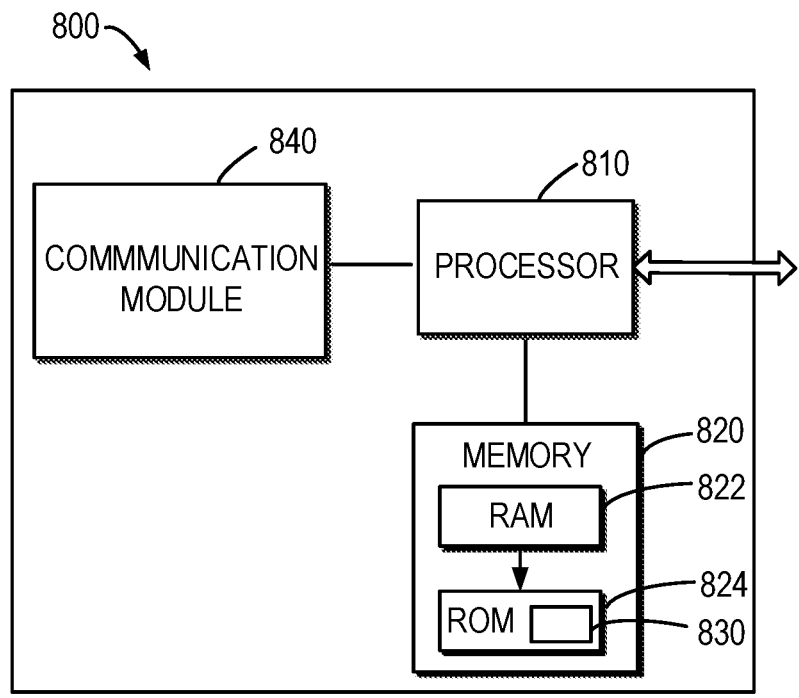
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. For example, the terminal device 110, the target master network device 120, the target secondary network device 130 and/or the source network device 140 as shown in FIG. 1 can be implemented by the device 800. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2-7. The embodiments of the present disclosure may also be implemented by hardware or by a combination of software and hardware.

Figure 9:
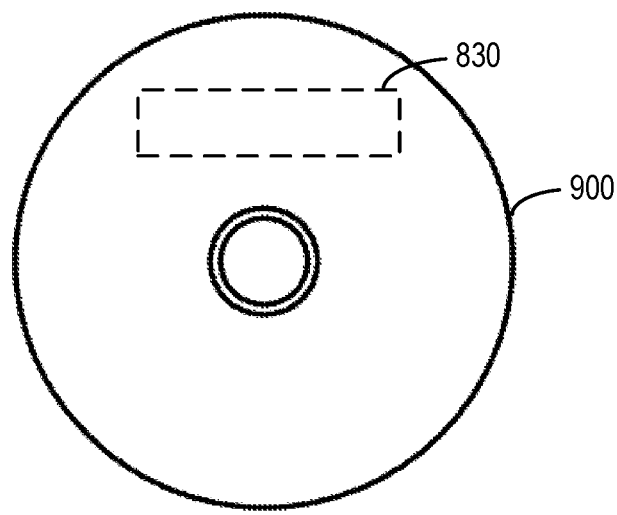
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 800 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 800 may be instead comprised in the distributed unit, and at least some of the described processes may be performed by the distributed unit.

In an embodiment, the execution of at least some of the functionalities of the device 800 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 800 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5, the method 600 as described above with reference to FIG. 6 and/or the method 700 as described above with reference to FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one memory including computer program codes;
   the at least one memory and the computer program codes are configured to, with the at least one processor, cause the terminal device to perform:
   receiving a connection reconfiguration message from source network device connected with the terminal device, the connection reconfiguration message comprising a first configuration about target master network device, a second configuration about target secondary network device, a third configuration about a signaling radio bearer between the target secondary network device and the terminal device, and a fourth configuration about a timer;
   performing first random access to the target master network device based on the first configuration and second random access target secondary network device based on the second configuration, to connect to the target master network device and the target secondary network device;
   in response to failure of the first random access and success of the second random access, reconnecting to the target mater network device based on the first configuration while keeping connected to the target secondary network device;
   transmitting a connection reestablishment message to the target master network device;
   initiating the timer to monitor success of the reconnection to the target master network device;

determining whether the reconnection to the target master network device fails, wherein reconnection to the target master network device fails at least in response to timeout of the timer;

in accordance with a determination that the reconnection to the target master network device fails, reconnecting to the source network device or connecting to a device discovered in cell selection initiated by the terminal device; and in response to receiving a connection release message from the target secondary network device via the signaling radio bearer, disconnecting from the target secondary network device.

* * * * *